United States Patent [19]

Kodama et al.

[11] Patent Number: 5,752,655
[45] Date of Patent: May 19, 1998

[54] AUTOMOTIVE AIR-CONDITIONING APPARATUS WITH COMBUSTION HEATER

[75] Inventors: Satoru Kodama, Obu; Yasuo Kondo, Okazaki; Shinichi Mashimo, Obu; Akira Isaji, Nishio, all of Japan

[73] Assignee: Nippondenso Co., Ltd., Kariya, Japan

[21] Appl. No.: 511,239

[22] Filed: Aug. 4, 1995

[30] Foreign Application Priority Data

Aug. 4, 1994 [JP] Japan .................. 6-183293

[51] Int. Cl.$^6$ .................. B60H 1/02
[52] U.S. Cl. .................. 237/12.3 B; 237/12.3 C
[58] Field of Search .................. 237/12.3 C, 12.3 B

[56] References Cited

U.S. PATENT DOCUMENTS

| | | | |
|---|---|---|---|
| 2,476,295 | 7/1949 | Hans | 237/12.3 B |
| 4,300,720 | 11/1981 | Baier et al. | 237/12.3 B |
| 4,883,226 | 11/1989 | Tomita et al. | 237/12.3 C |

FOREIGN PATENT DOCUMENTS 6-179318  6/1994  Japan .

Primary Examiner—Henry A. Bennett
Assistant Examiner—Derek S. Boles
Attorney, Agent, or Firm—Cushman Darby & Cushman IP Group of Pillsbury Madison & Sutro LLP

[57] ABSTRACT

To prevent a thermal medium from assuming a superheated state and to stably supply hot air for warming in an apparatus which performs warming by a combustion heater. A hot-water recirculation path connecting a hot-water heater core, water pump, cooler for a motor for running use and an inverter device, first switching valve, and combustion heater in a closed loop is provided. A temperature sensor is disposed at an intermediate location in the hot-water recirculation path. A heat-radiating passage having a second switching valve and radiator is connected to the hot-water recirculation path. During heating operation, an ECU closes the second switching valve and switches off a radiator fan when a detected temperature of the first temperature sensor is less than a set temperature for radiating heat, and opens the second switching valve and switches off the radiator fan when the detected temperature of the first temperature sensor is the set temperature for radiating heat or more.

3 Claims, 13 Drawing Sheets

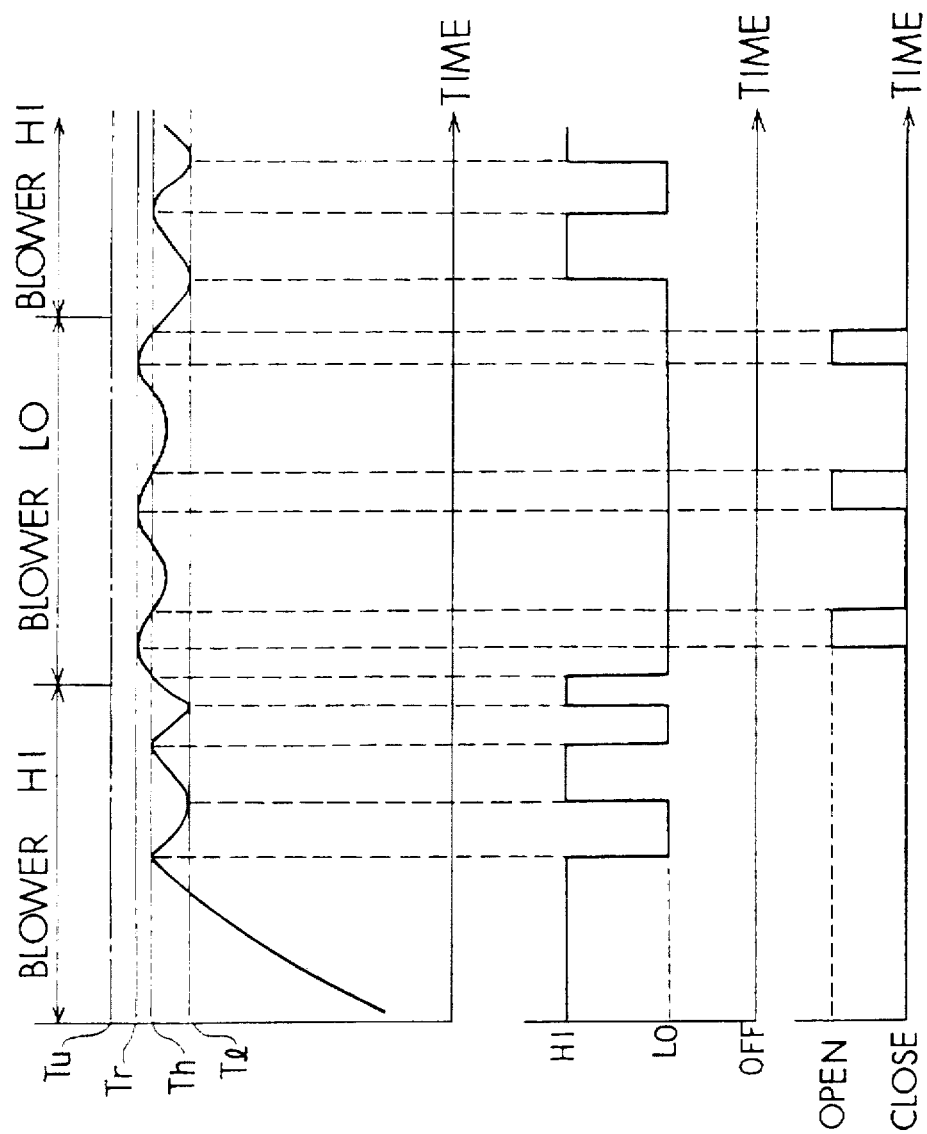

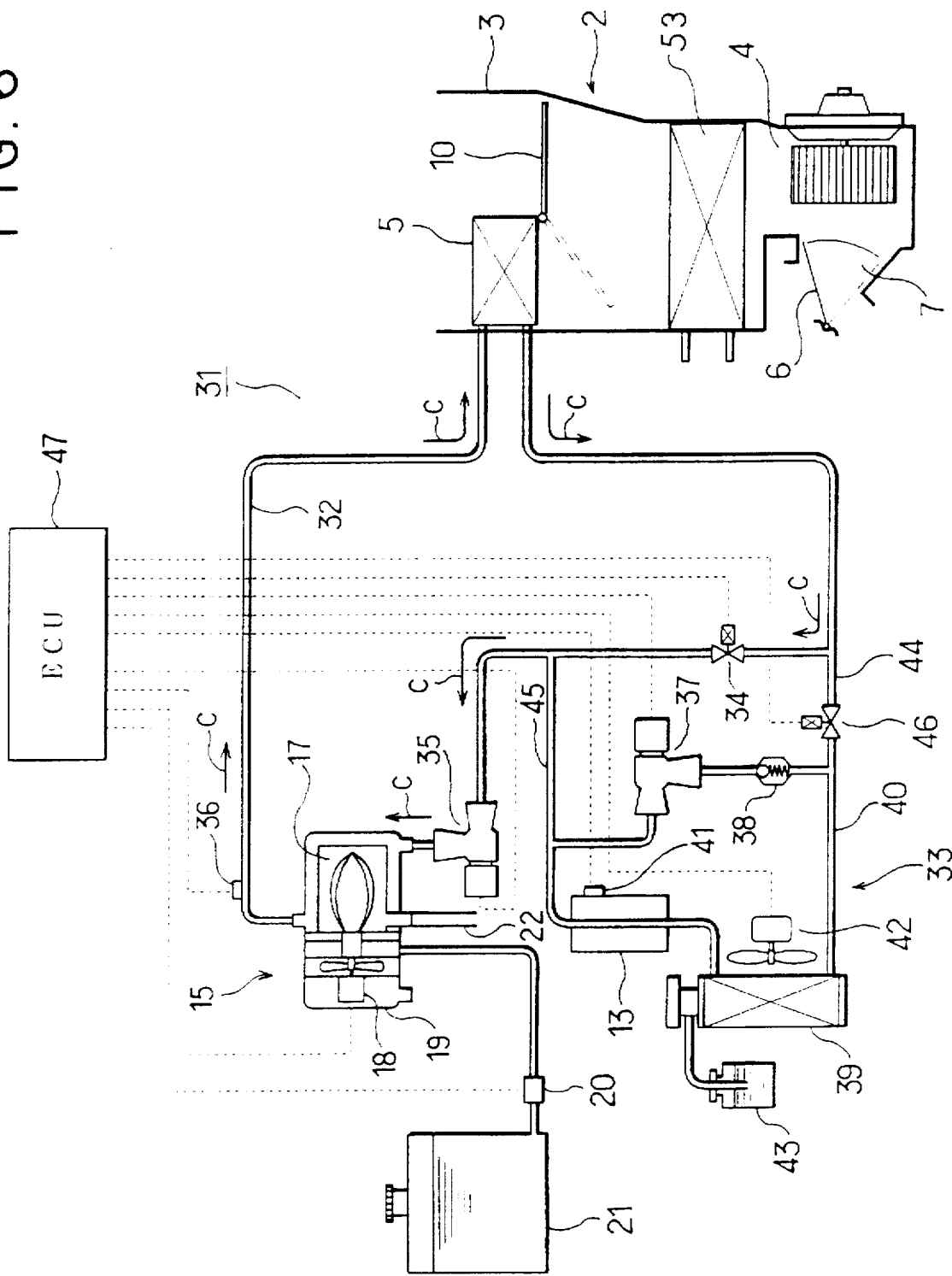

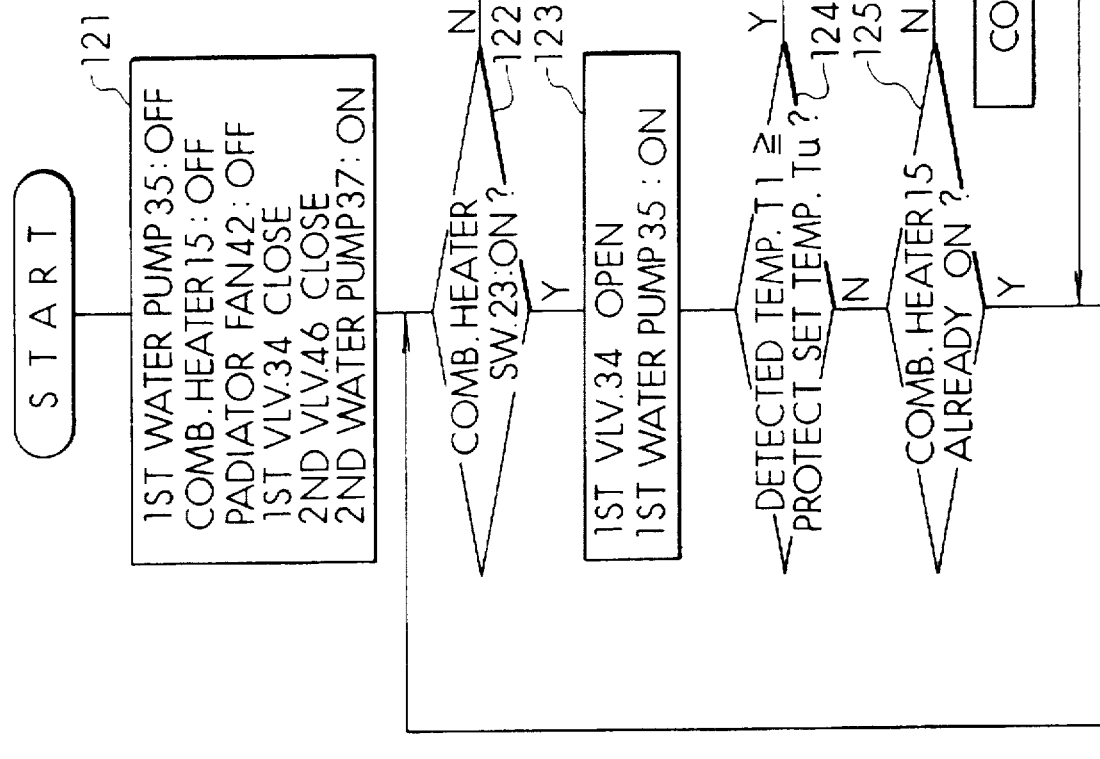

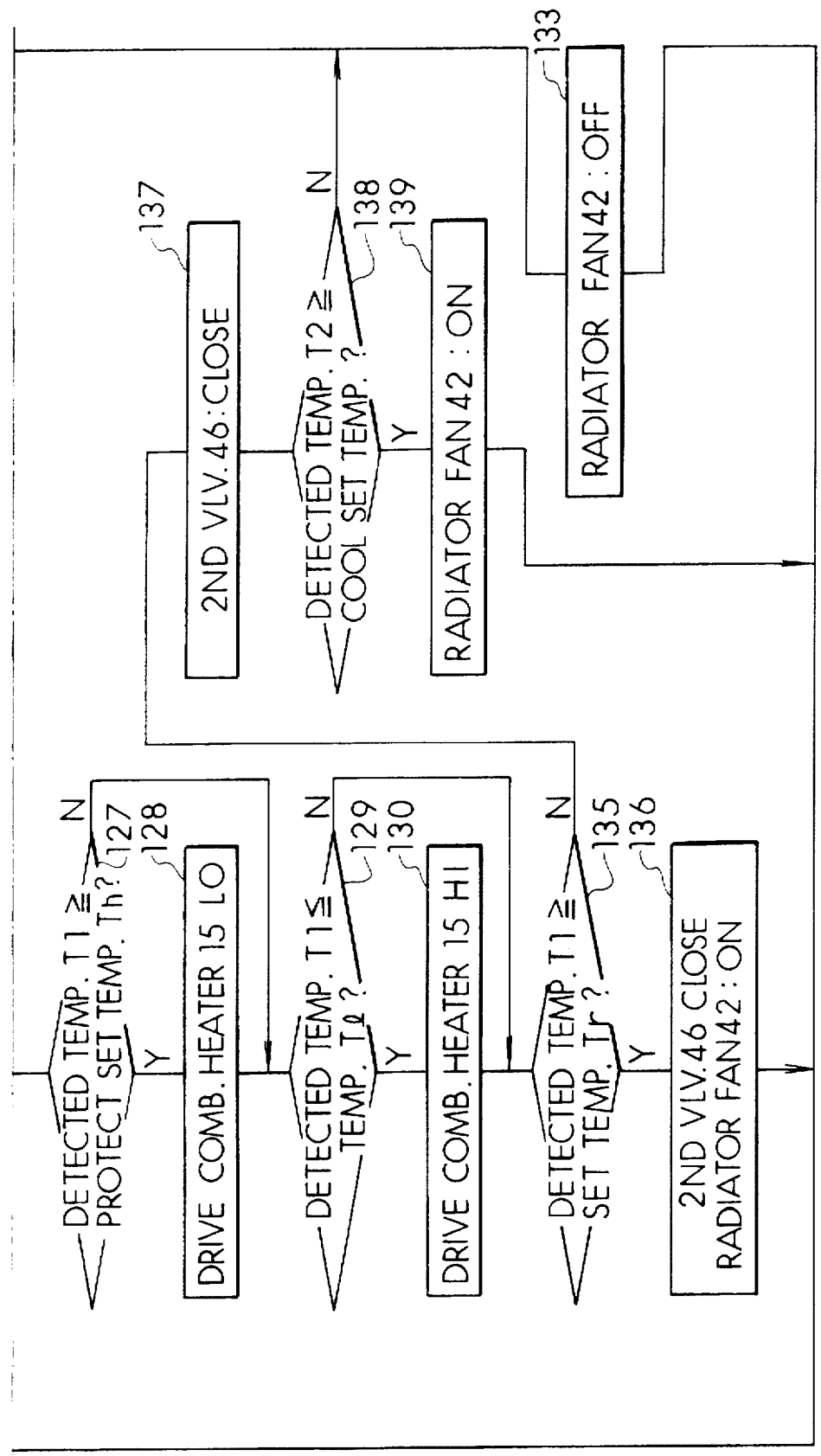

FIG. 11

|  | COOLING MODE | HEATING MODE | WATER TEMP. ≧ SET TEMP. Tr |
|---|---|---|---|
| COMB HEATER 15 | OFF | ON | ON |
| WATER PUMP 12 | ON | ON | ON |
| 1ST VLV. 14 | CLOSE | OPEN | OPEN |
| 2ND VLV. 64 | OPEN | CLOSE | OPEN |
| 3RD VLV. 56 | CLOSE | OPEN | CLOSE |
| RADIATOR FAN 66 | ON | OFF | ON |
| COMPRESSOR 57 | ON | OFF | OFF |

1

AUTOMOTIVE AIR-CONDITIONING APPARATUS WITH COMBUSTION HEATER

CROSS REFERENCE TO RELATED APPLICATION

This application is based upon and claims priority from Japanese Patent Application No. Hei 6-183239 filed Aug. 4, 1994, the contents of which are incorporated herein by reference.

BACKGROUND OF THE INVENTION

1. Field of the Invention

The present invention relates to an air-conditioning apparatus for vehicle wherein thermal medium heated by a combustion-type heater is recirculatingly supplied to a heat exchanger for heating.

2. Related Art

In an automotive air-conditioning apparatus of for example an electric automobile, a device employing electrical energy is utilized in a heater for warming use. However, attempting to obtain adequate warming performance by electrical energy alone, particularly in a cold-climate region or the like, may lead to a state which is undesirable for an electric automobile wherein large electrical power is required and battery consumption becomes large.

Meanwhile, in an engine-powered vehicle, it is generally attempted to obtain hot air for warming use from hot water warmed by heat generation of the engine through a structure leading a coolant-water path of the engine to a heater core, but a diesel-engine vehicle such as a large-size bus, transport vehicle, or the like may provide a combustion heater to burn fuel and heat coolant water of the engine as an auxiliary heater.

By providing this combustion heater as an auxiliary heater, engine coolant water is warmed promptly and engine starting can be performed with ease even in winter or in a cold-climate region, and additionally, the combustion heater can be used as an auxiliary heat source and it becomes possible to heighten the warming effect.

Accordingly, to perform warming which does not depend on electrical energy in an air-conditioning apparatus of an electric automobile, a structure may be considered whereby hot water warmed by a combustion heater as described above is led to a heater core to obtain hot air for warming use. In this case, however, there is no utilization as an auxiliary heat source as in the above-described diesel-engine vehicle, and so occurrence of a problem such as the following is predicted.

In an automotive air-conditioning apparatus is, a passenger, for example, sets an amount of heated air and temperature, degree of opening of a damper of a heater-core portion and blower air are switched on a basis thereof, and an amount of radiated heat from the heater core is regulated thereby. In contrast to this, the amount of generated heat (combustion intensity) of the combustion heater has a lower limit from combustion stability; when for example the amount of radiated heat from the heater core is minute or zero, it leads to a state where the hot water becomes superheated.

If the hot water assumes a superheated state in this way, it becomes necessary to stop the combustion heater in order to protect the combustion heater, piping, and so on. However, if the combustion-type heater is stopped once, the temperature of the hot water and ultimately the temperature within the passenger compartment drop suddenly, and it becomes necessary to cause to work the combustion heater again, but the rise of the combustion heater is slow (i.e., re-ignition after stoppage requires time), and it becomes impossible to supply hot water of the required temperature during this interval.

SUMMARY OF THE INVENTION

In light of the above-described circumstances, it is an object of the present invention to provide an automotive air-conditioning apparatus with a combustion heater supplying a stabilized hot air and preventing, to a great extent, a thermal medium from falling into a superheated state.

In one preferred mode of an automotive air conditioning apparatus in the present invention includes a blower, a main body unit, a heat exchanger, a thermal-medium recirculation path, a combustion heater, a heat-radiating passage, a heat radiator, switching device, detecting device and controlling device. The blower blows air. The main body unit forms an air passage. The blower is disposed upstream of the air passage. The heat exchanger is disposed in the air passage for heating the air led to a vehicle passenger compartment. The thermal-medium recirculation path recirculatingly supplies a thermal medium to the heat exchanger. The combustion heater is disposed within the thermal-medium recirculation path for heating the thermal medium. An inlet portion and outlet portion of the heat-radiating passage are connected to the thermal-medium recirculation path. The heat radiator is disposed in the heat-radiating passage for radiating heat of the thermal medium passing through the heat-radiating passage. The switching device switches to open and close the heat-radiating passage. The detecting device detects temperature of thermal medium in the thermal-medium recirculation path. The controlling device controls the switching device to open when a temperature detected by the detecting device reaches an set temperature of radiating heat or more.

Preferably, the heat-radiating passage and the heat radiator are commomly used with at least one portion of a cooling apparatus provided to cool a power source of a vehicle.

Preferably, the combustion heater stops when a detected temperature of the detecting device reaches an set temperature for protection or more which is higher than the set temperature for radiating heat.

Preferably, the air conditioning apparatus includes a pump performing recirculation of the thermal medium in the heat-radiating passage and recirculation of the thermal medium in the thermal-medium recirculation path.

Preferably, the air conditioning apparatus includes a cooler for heat generating device such as a motor for running and an inverter. The cooler is disposed in the thermal-medium recirculation path.

In the automotive air conditioning apparatus, temperature of the thermal medium heated by the combustion heater is detected by the temperature detecting device, and when the detected temperature becomes the set temperature or more, heat of the thermal medium is discharged to outside the vehicle by a heat-radiating device. Consequently, the temperature of the thermal medium can be lowered without causing the combustion heater to stop and a superheated state of the thermal medium can be prevented, even when an amount of radiated heat from a heat exchanger for heating use is small.

In the air-conditioning apparatus, when performing heating of the passenger compartment, the combustion heater provided in the thermal-medium recirculation path is driven and thermal medium is heated, the thermal medium thereof is supplied to the heat exchanger provided in the main body unit, heat exchange is performed by blown air from the blower, and hot air is supplied into the passenger compartment thereby. Herein, temperature of the thermal medium is detected by the temperature detecting device, and when the detected temperature becomes the set temperature for radiating heat or more, the switching device to open and close the heat-radiating passage connected to the thermal-medium recirculation path is opened by the controlling device, and thermal medium in the thermal-medium recirculation path passes through the heat exchanger of the heat-radiating passage and heat is discharged to outside the vehicle. Consequently, the temperature of the thermal medium can be lowered without causing the combustion heater to stop and a superheated state of the thermal medium can be prevented, even when an amount of radiated heat from the heat exchanger for heating is small.

When structured so that the combustion heater is caused to be stopped when detected temperature of the temperature-detecting device becomes the set temperature for protection or more which is higher than the set temperature for heat-radiating, protection of the piping and the like of the combustion heater and thermal-medium recirculation path can be performed more effectively.

Furthermore, when structured so that recirculation of thermal medium in the heat-radiating passage and recirculation of thermal medium in the thermal-medium recirculation path are performed by one pump, structure can be caused to be simple in comparison with a case where a pump is provided respectively in both the passage for heat-radiating use and the thermal-medium recirculation path.

BRIEF DESCRIPTION OF THE DRAWINGS

FIGS. 4A–4C are waveforms respectively indicating relationship between water temperature T0 detected by a sensor and blower modes, an amount of generated heat of a combustion heater and blower modes, and opening and closing mode of a second switching valve and blower modes;

FIG. 6 is a schematic view indicating a system structure of an air conditioning apparatus describing flow of hot water during heating with respect to a second embodiment of the present invention;

FIG. 9 consists of FIGS. 9A and 9B which together show a flowchart indicating control of the air conditioning apparatus during heating;

FIG. 11 is a table indicating an on-off relationship of several devices during cooling and heating modes.

DETAILED DESCRIPTION OF THE PREFERRED EMBODIMENTS

Several embodiments applying the present invention in an air-conditioning apparatus for automotive use will be described hereinafter with reference to the drawings.

(1) First Embodiment

Firstly, a first embodiment according to the present invention (corresponding to the first through fifth claims) will be described hereinafter with reference to FIGS. 1 through 5.

Figure 1:
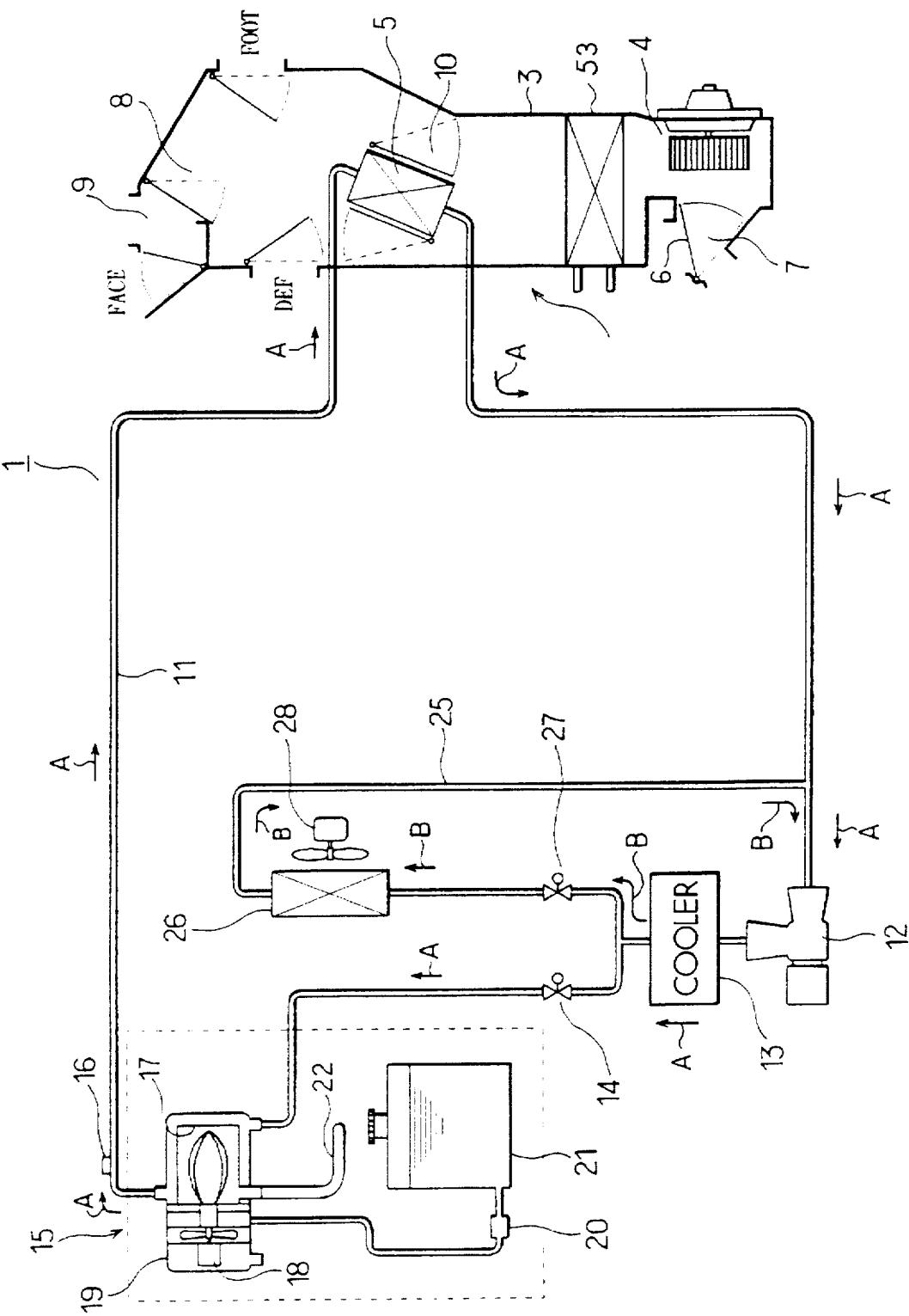
FIG. 1 is a schematic view indicating an overall system structure of an air conditioning apparatus of a first embodiment according to the present invention.

FIG. 1 indicates a schematic system structure of an air conditioning apparatus 1 relating to the present embodiment. Herein, a main body unit 2 disposes a blower 4 within an air duct 3 structuring a portion of an air passage positioned at an upstream portion thereof, and together with this, disposes an evaporator 53 as a heat exchanger for cooling use and a hot-water heater core 5 as a heat exchanger for heating use downstream thereof.

Additionally, an induction port 7 where inner air and outer air are switched by an inner-outer air switching damper 6 is disposed at the most upstream portion of the air duct 3, a plurality of air outlets 9 opened and closed by a damper 8 and communicated with respective vents (not illustrated) are formed in a downstream portion of the air duct 3. Moreover, an air-mix damper 10 to regulate an amount of passing air with respect to the hot-water heater core 5 is disposed in the proximity of the hot-water heater core 5.

The hot-water heater core 5 is such that thermal medium—in this case, hot water (water)—passes through a hot-water recirculation path 11 which is a thermal-medium recirculation path and is recirculatingly supplied. This hot-water recirculation path 11 is structured of the hot-water heater core 5, a water pump 12 to cause to recirculate hot water, a cooler 13 of a motor for running use which is a drive source of an electric automobile and an inverter device, a first switching valve 14 composed of an electromagnetic valve, and a combustion heater 15 composed of a heating source, which are connected into a closed loop in this sequence thereof by pipes. Additionally, a temperature sensor 16 which is a temperature-detecting device to detect the temperature of the hot water is provided in an intermediate location of the hot-water recirculation path 11 (in this case, between the combustion heater 15 and hot-water heater core 5). Furthermore, the temperature sensor 16 may be disposed anywhere, such as in the proximity of the cooler 13, as long as it is in the hot-water recirculation path 11.

The combustion heater 15 is structured of a combustion chamber 17, a fan motor 18 for combustion use, and a fuel tank 21 connected via a fuel pump 20 to a body 19 having a glow plug or the like for ignition use (not illustrated), and is structured so that fuel (for example light oil) discharged from the fuel pump 20 by the fan motor 18 for combustion and air taken in from outside are mixed, sprayed into the combustion chamber 17, and caused to burn. Through this, hot water in the hot-water recirculation path 11 is heated when passing through a perimeter portion of the combustion chamber 17. Gas exhaust from the combustion chamber 17 is performed by an exhaust-gas muffler 22.

Accordingly, this combustion heater 15 is such that operation is controlled by an ECU (electric control unit) 24 on a basis of a combustion heater switch 23 disposed for example on a control panel in the passenger compartment being switched on. According to the present embodiment, this combustion heater 15 is such that the amount of generated heat (combustion intensity) can be switched to two stages—i.e., HI and LO—by causing the amount of fuel supplied by the fuel pump 20 and rotation of the fan motor for combustion 18 to be varied in two stages. As will also be stated later in the description of mode of operation, the ECU 24 is structured so as to perform automatic switching of HI operation, LO operation, or stoppage of the combustion heater 15 on a basis of a detected temperature T0 of the temperature sensor 16.

A heat radiating passage 25 for radiating heat is provided in the hot-water recirculation path 11. An inlet side of the heat-radiating passage 25 is connected between the cooler 13 and first switching valve 14, and an outlet side is connected between the hot-water heater core 5 and water pump 15. Accordingly, a radiator 26 which is a heat radiator and, along with this, a second switching valve 27 composed of an electromagnetic valve as a switching device are provided in an intermediate location of the heat-radiating passage 25. The radiator 26 is structured so as to discharge heat of hot water passing through the heat-radiating passage 25 to outside the vehicle by a radiator fan 28 being driven. Through this, a heat-radiating device is structured by the heat-radiating passage 25, radiator 26, second switching valve 27, radiator fan 28, and so on.

Figure 2:
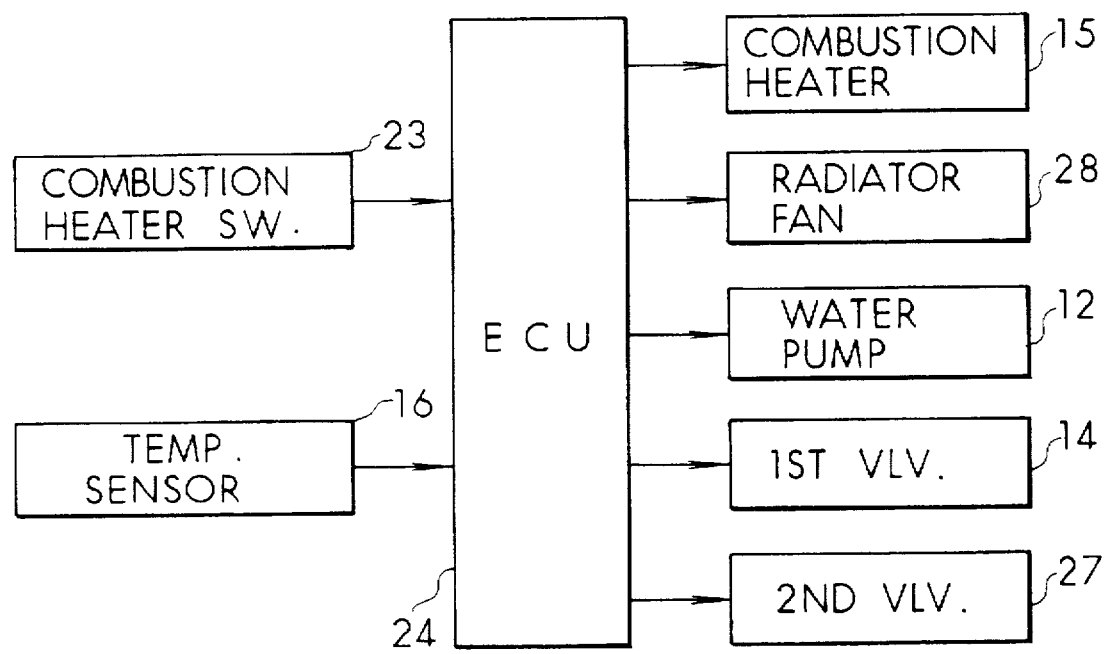
FIG. 2 is a block diagram indicating an electrical structure of a main portion.

FIG. 2 schematically indicates an electrical structure of a portion relating to the combustion heater 15, centering on the ECU 24. The ECU 24 is input with signals from the combustion heater switch (s/w) 23 and temperature sensor 16 in the above-described manner, and along with this, controls the foregoing combustion heater 15, radiator fan 28, water pump 12, and first switching valve 14.

At this time, as will be stated in detail later in the description of mode of operation, during heater operation (i.e., when the combustion heater switch 23 is on), the ECU 24 is structured, by software structure thereof, so as normally (i.e., when the detected temperature T0 of the temperature sensor 16 is less than an set temperature for heat-radiating Tr) to switch on the water pump 12 together with opening the first switching valve 14, and to close the second switching valve 27 together with switching off the radiator fan 28.

Accordingly, the ECU 24 is structured so as to open the second switching valve 27 together with switching on the radiator fan 28 when there is a case that the temperature of the hot water will assume a superheated state (i.e., when the detected temperature T0 of the temperature sensor 16 has become the set temperature Tr for heat-radiating or more). Consequently, the ECU 24 functions as a switch-controlling device in terms of the present invention.

Furthermore, according to the present invention, the ECU 24 is structured so as to switch off (stop) the combustion heater 15 if the detected temperature T0 of the temperature sensor 16 has become an set temperature Tu for protection which is higher than the set temperature Tr for heat-radiating. Additionally, although illustration and detailed description are omitted, the ECU 24 also controls the blower 4, the several dampers 6, 8, and 10, and a compressor and the like of the refrigeration cycle on a basis of control-panel operation in the passenger compartment and detection of various sensors.

Moreover, at a time other than heating, the first switching valve 14 is closed and the second switching valve 27 is opened, but the water pump 12 and radiator fan 28 are driven if necessary. Through this, the heat radiating passage 25, radiator 26, and so on function as a cooling device to cool the motor for running use which is a drive source and the inverter device.

A mode of operation of the above-described structure will be described next with reference to FIGS. 3 to 5. The flowchart of FIG. 3 indicates the control executed by the ECU 24 during heating with respect to the combustion heater 15 and a periphery thereof. FIG. 4 indicates a relationship between a detected temperature T0 (water temperature) of the temperature sensor 16 at the time thereof, and an amount of generated heat (HI/LO switching) of the combustion heater 15 and opening and closing of the second switching valve 27.

Firstly, initialization is performed in step 101, and the combustion heater 15 is stopped and the first switching valve 14 is closed. Additionally, the second switching valve 27 is opened and the water pump 12 and radiator fan 28 are switched off at this time. Moreover, this water pump 12 and radiator fan 28 are so as to be switched on as required (i.e., when cooling of the inverter device and motor for running use is required) even in a case of a time other than heating.

Thereafter, when the combustion heater switch 23 is switched on ("Yes" in step 102), the first switching valve 14 is opened and the second switching valve 27 is closed, and moreover the water pump 12 is switched on (step 103). In the subsequent step 104, it is determined whether the detection temperature T0 of the temperature sensor 16 is the set temperature Tu for protection or more, and if less than the set temperature Tu for protection ("No"), the combustion heater 15 is switched on (HI operation—step 106) except in a case where the combustion heater 15 is already on ("Yes" in step 105).

Through this, as indicated by the arrows A in FIG. 1, recirculation is repeated in which hot water in the hot-water recirculation path 11 is heated by the combustion 15 and flows into the hot-water heater core 5, then passes through the water pump 12 and cooler 13 to reach the combustion heater 15; wind generated by the blower 4 passes through the hot-water heater core 5 and is heated, and hot air is supplied to the passenger compartment thereby. Moreover, although not illustrated, the amount of blown air of the blower 4 and the opening or closing of the several dampers 6, 8, and 10 are controlled at this time on a basis of setting of amount of heated air, temperature, or the like through to operation of the control panel.

Accordingly, switching control for HI operation or LO operation of the combustion heater 15 is performed based on the detected temperature T0 of the temperature sensor 16 in steps 107 through 110 during operation of this combustion heater 15, but this is performed so as to switch to LO operation when the detected temperature T0 becomes a temperature Th (for example 80° C.) or more (in step 107), and to switch to HI operation (step 110) when the detected temperature T0 thereafter drops to a temperature T1 (for example 70°) or less ("Yes" in step 109). Through this, the temperature of the hot water is maintained stably at 70° to 80° C.

Furthermore, the temperature of the hot water can be maintained by this switching of HI operation and LO operation of the combustion heater 15 when there is a certain amount of radiated heat from the hot-water heater core 5, but when the amount of radiated heat from the hot-water heater core 5 becomes minute (or zero) due to circumstances of combustion stability which are characteristic of the combustion heater 15, such as in a case where for example the amount of blown air from the blower 4 is small, the temperature of the hot water rises to exceed the temperature Th and there is a case that a superheated state may ultimately result, even if LO operation is performed.

In this regard, according to the present embodiment, the detected temperature T0 of the temperature sensor 16 is compared with the set temperature Tr for heat-radiating in step 111, and when it has become the set temperature Tr for heat-radiating or more ("Yes"), the second switching valve 27 is opened and the radiator fan 28 is switched on (step 112). The foregoing set temperature Tr for heat-radiating is set to be a temperature higher than the temperature Th and lower than the set temperature Tu for protection, for example either 80° to 93° C.

Through this, as indicated by the arrows B in FIG. 1, recirculation in which a portion of the hot water which exits the cooler 13 passes through the heat-radiating passage 25 to reach the radiator 26 and radiate heat, then again reaches the water pump 12, is performed in conjunction with the recirculation indicated by the arrows A, so that heat from hot water passing through the heat-radiating passage 25 is radiated to outside the vehicle and temperature can be lowered. Moreover, the ratio of the amount of flow of hot water on the hot-water recirculation path 11 side and the heat-radiating passage 25 side at this time is set so that the temperature of the hot water can adequately be lowered in accordance to radiator 26 capacity and the like. Thereafter, when the detected temperature T0 of the temperature sensor 16 falls below Tr ("No" in step 111), the second switching valve 27 is opened and the radiator fan 28 is switched off (step 113).

Moreover, even in a case which may lead to a circumstance wherein water temperature is not lowered even by the heat-radiating passage 25 and radiator 26 due to a cause such as a failure or the like, when the detected temperature T0 of the temperature sensor 16 becomes the set temperature Tu for protection or more ("Yes" in step 114), the combustion heater 15 is switched off (step 114). Consequently, the hot water does not assume a superheated state in any case.

By controlling the combustion heater 15, second switching valve 27, radiator fan 28, and so on in this way, the temperature of the hot water can be lowered without causing the combustion heater 15 to be stopped and the hot water in the hot-water recirculation path 11 can be prevented from reaching a superheated state even when the amount of radiated heat from the hot-water heater core 5 is low, as shown in FIG. 4. Consequently, even if there are circumstances where re-ignition after stoppage of the combustion heater 15 requires time, the temperature of the hot water can be caused to be maintained and stabilized warming can be performed.

Figure 5A:
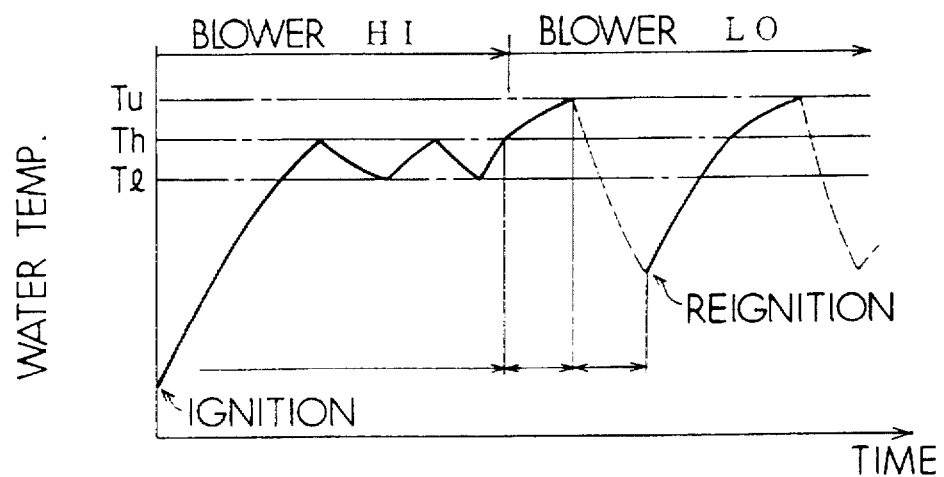
FIGS. 5A and 5B are waveforms for comparison with a relationship between water temperature and blower modes, and an amount of generated heat of a combustion heater and blower modes in an air conditioning apparatus according to the related art.
Figure 5B:
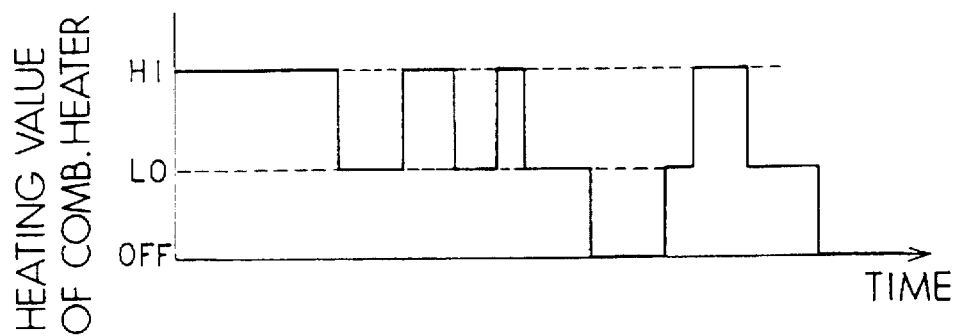

As an incidental comment, FIG. 5 indicates, for reference purposes, a relationship between temperature of hot water and amount of generated heat of a combustion heater in an air-conditioning apparatus in a case where a heat-radiating passage 25 is not provided while employing a combustion heater equivalent to the present embodiment. Whereas in this FIG. 5 there exists the problem that when an amount of radiated heat of a heater core becomes small, the combustion heater must be stopped for the purpose of protection, water temperature drops sharply, and stabilized warming cannot be performed, it can be understood that according to the present embodiment (FIG. 4), protection can be attempted without performing such stoppage of the combustion heater 15, and stabilized warming can be performed.

According to the present embodiment, in an electric automobile where there exist circumstances in which an adequate amount of radiated heat cannot be obtained from the motor for running use and inverter device, adequate hot air for warming can be obtained without depending on electrical energy, even in winter or in a cold-climate region, by utilizing the combustion heater 15. Accordingly, by providing the heat-radiating passage 25, second switching valve 27, radiator 26, and radiator fan 28, favorable practical effects can be obtained in which a superheated state of hot water can be prevented without causing the combustion heater 15 to be stopped and hot air for warming can be supplied stably, even when the amount of radiated heat from the hot-water heater core 5 is small.

Additionally, the present embodiment is structured so as to cause the combustion heater 15 to be stopped if the detected temperature T0 of the temperature sensor 16 should happen to become the set temperature Tu for protection or more which is higher than the set temperature Tr for heat-radiating, and so protection of the pipes and the like of the combustion heater 15 and hot-water recirculation path 11 can be performed more effectively.

Additionally, according to the present embodiment in particular, advantages can be obtained wherein the foregoing heat-radiating passage 25, radiator 26, and so on are structured so as to double in use as a cooling device of a motor for running use and inverter device, and so structure can be caused to be simple in comparison with a case where a cooling device is provided separately for the cooling device, and furthermore, recirculation of hot water in the hot-water recirculation path 11 and heat-radiating passage 25 is structured so as to be performed by one water pump 12, and so structure can be caused to be simple in comparison with a case where pumps are provided respectively.

Moreover, according to the above-described embodiment, when the detected temperature T0 of the temperature sensor 16 became the set temperature Tr for heat-radiating or more, the heat-radiating passage 25 was used (i.e., the second switching valve 27 was opened) and heat radiation by the radiator 26 was caused to be performed until the detected temperature T0 fell below the set temperature Tr for heat-radiating but it is also possible to structure so that heat radiation by the radiator 26 is caused to be performed until for example water temperature falls to another set temperature or less, or so that heat radiation by the radiator 26 is caused to be performed for a uniform time. Additionally, the several set temperatures Tu, Tr, Th, and T1 are not exclusively limited to the specific examples within the present embodiment, and the specific numerical values thereof can be modified according to convenience within a scope which does not depart from the essence. Furthermore, the cooling device may be structured not as a device to cool both a motor for running use and an inverter device, but rather be made to be a motor-cooled type to cool only an inverter device with a large amount of radiated heat.

(2) Second Embodiment

A second embodiment according to the present invention will be described next with reference to FIGS. 6 through 9. According to the present embodiment as well, the structure of the body unit 3, combustion heater 15, and the like are common with the above-described first embodiment, and so detailed description of portions identical with the first embodiment will be omitted.

Figure 7:
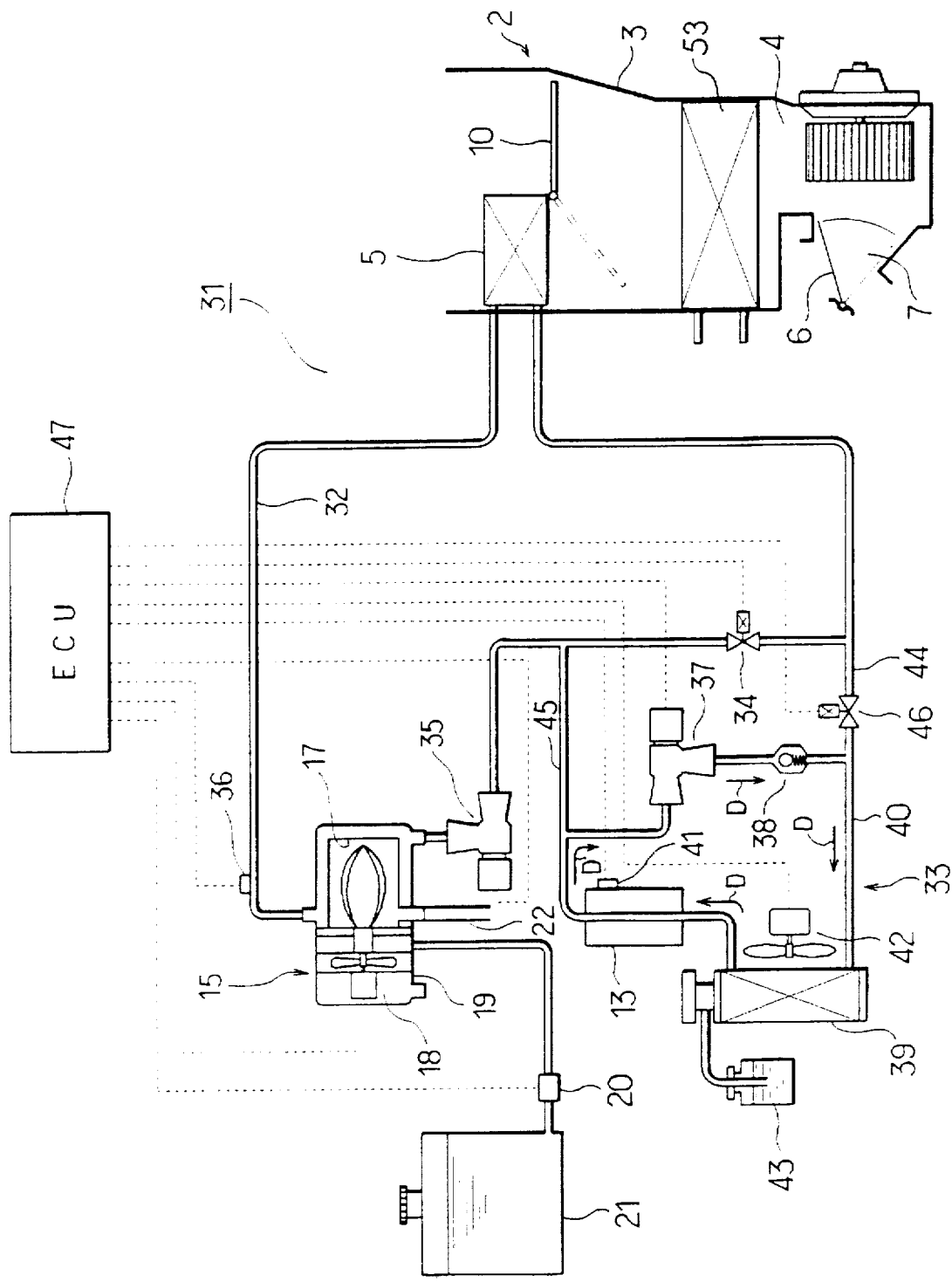
FIG. 7 is a schematic view corresponding to FIG. 6 to describe flow of hot water during cooling.
Figure 8:
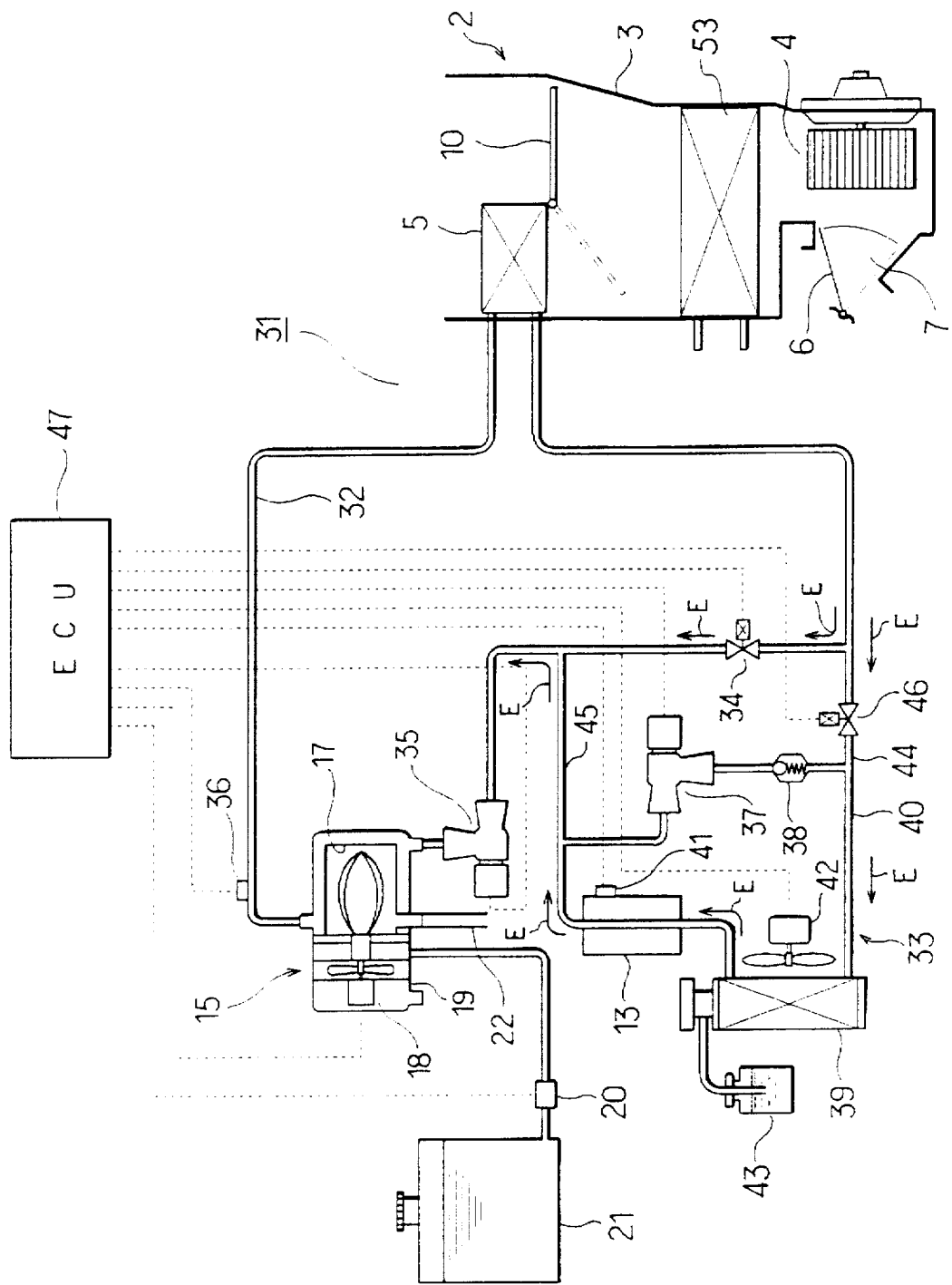
FIG. 8 is a schematic view corresponds to FIG. 6 to describe flow of hot water in different mode during heating.

FIGS. 6 through 8 indicate a schematic system structure of an air-conditioning apparatus relating to the present embodiment. A differences with the foregoing first embodiment is that recirculation of hot water in a hot-water recirculation path 32 and recirculation of hot water in a cooler device 33 which doubles in use as a heat-radiating passage are performed by separate systems. That is to say, the hot-water recirculation path 32 is structured by sequentially connecting a hot-water heater core 5, first switching valve 34, first water pump 35, and combustion heater 15 in a closed loop. Additionally, a first temperature sensor which is a temperature-detecting device is provided in the proximity of the combustion heater 15.

Through this, during heater operation, the first switching valve 34 is opened and, along with this, the combustion heater 15 and a water pump are switched on, and as indicated by arrows C in FIG. 6, recirculation is repeated in which thermal medium (hot water) in the hot-water recirculation path 32 is heated by the combustion heater 15 and flows into the hot-water heater core 5, then passes through the first water pump 35 to reach the combustion heater 15. Because of this, wind generated by a blower 4 passes through the hot-water heater core 5 portion and is heated, and hot air is supplied to the passenger compartment thereby. Additionally, automatic switching and so on of HI operation and LO operation of the combustion heater 15 are performed based on a detected temperature T1 of the first temperature sensor 36.

Meanwhile, the foregoing cooling device 33 is structured by sequentially connecting a cooler 13 of a motor for running use which is a drive source of an electric automobile and an inverter device, a check valve 38, and a radiator 39 which is a heat-radiating device, through a coolant-water path 40. Accordingly, a second temperature sensor 41 to detect the temperature of the coolant water is provided in the above-mentioned cooler 13 portion. Additionally, the radiator 39 is structured so as to discharge heat of coolant water passing through the coolant-water path 40 to outside the vehicle by a radiator fan 42 being driven. A reservoir tank 43 is additionally installed on the radiator 39.

Through this, in for example summer when heater operation is not performed, the second water pump 37 is switched on and, together with this, the radiator fan 42 is driven when the detected temperature T2 of the second temperature sensor 41 is high, and as indicated by the arrows D in FIG. 7, recirculation is repeated in which coolant water (hot water) in the coolant-water path 40 passes through the passes through the cooler 13 and usurps heat from the motor for running use and the inverter device, then passes successively through the second water pump 37 and check valve 38, flows into the radiator 39 where heat thereof is radiated to outside the vehicle, and again reaches the cooler 13; cooling of the motor for running use and inverter device is performed thereby.

Accordingly, the hot-water recirculation path 32 and coolant-water path 40 are connected at two places by an inlet-side interconnection path 44 and outlet-side interconnection path 45. Of these, the inlet-side interconnection path 44 is disposed so as to connect an intermediate portion of the hot-water heater core 5 and first switching valve 34 of the hot-water recirculation path 32 with an intermediate portion of the check valve 38 and radiator 39 of the coolant-water path 40, and a second switching valve 46 which is a switching device is disposed at a portion therebetween. Additionally, the outlet-side interconnection path 45 is disposed so as to connect an intermediate portion of the first switching valve 34 and first water pump 35 of the hot-water recirculation path 32 with an intermediate portion of the cooler 13 and second water pump 37 of the coolant-water path 40.

The second switching valve 46 is opened by an ECU 47 which is a switch-controlling device when a detected temperature T1 of the first temperature sensor 36 has become a set temperature for heat-radiating Tr or more. Through this, as indicated by the arrows E in FIG. 8, a portion of the hot water in the hot-water recirculation path 32 flows into the coolant-water path 40 from the inlet-side interconnection path 44, passes through the radiator 39 and radiates heat to outside the vehicle, passes through the cooler 13, and returns from the outlet-side interconnection path 45 to the hot-water recirculation path 32. Through this, a heat-radiating passage is formed from substantially half of the coolant-water path 40 as well as the inlet-side interconnection path 44 and outlet-side interconnection path 45, and the heat-radiating passage and heat-radiating device (radiator 39) are structured so as to double in use as the cooling device 33.

The control indicated in the flowchart of FIG. 9 which consists of FIGS. 9A and 9B is performed by the ECU 47 in the foregoing structure as well. Firstly, in the initialization of step 121, the first water pump 35, combustion heater 15, and radiator fan 42 are switched off, the first switching valve 34 and second switching valve 46 are closed together, and only the second water pump 37 is switched on. Through this, coolant water is recirculated through the coolant-water path 40 as indicated by the arrows D, but in this state the radiator fan 42 is still off, and so hat radiation from the radiator 39 is not performed.

Herein, in for example summer when heater operation is not performed, i.e., when the combustion heater switch 23 has not been switched on ("No" in step 122), on-off control of the radiator fan 42 is performed on the basis of the temperature of the cooler 13 portion detected by the second temperature sensor 41. That is to say, when the detected temperature T2 of the second temperature sensor 41 becomes the cooling set temperature (for example 80° C.) or more ("Yes" in step 131), the radiator fan 42 is switched on (step 132), and when the detected temperature T2 of the second temperature sensor 41 is less than the cooling set temperature ("No" in step 131), the radiator fan 42 is switched off (step 133).

Figure 3:
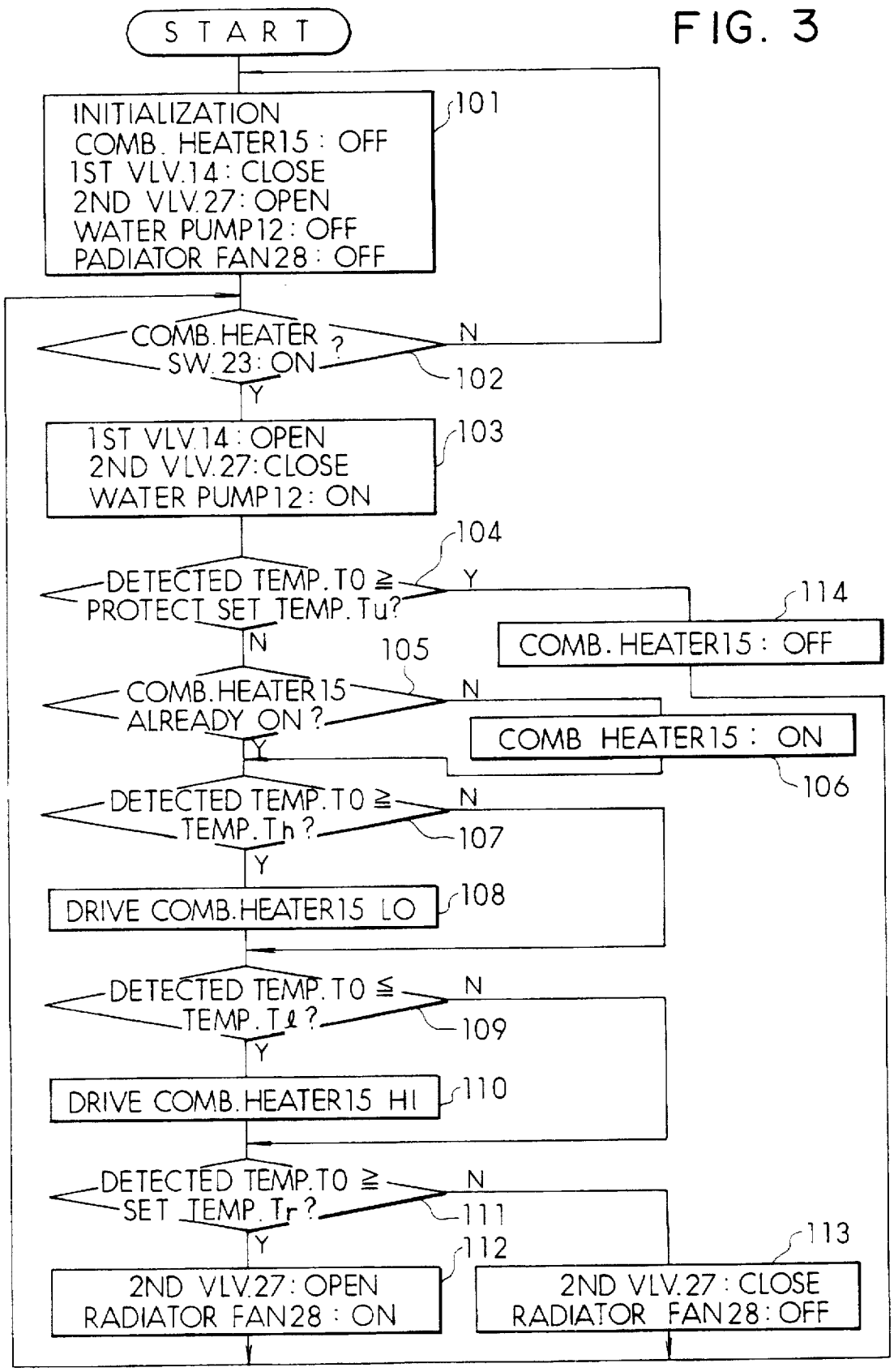
FIG. 3 is a flowchart indicating control flow during heating.

Meanwhile, when the combustion heater switch 23 is switched on ("Yes" in step 122), the first switching valve 34 is opened and along with this the first water pump 35 is switched on (step 132) and heater operation is performed, but from the subsequent step 124 up through step 130, processing similar to step 104 through step 110 in the flowchart of FIG. 3 for the above-described first embodiment is performed, with only the temperature sensor 16 being substituted by the first temperature sensor 36. Additionally, when the detected temperature T1 of the first temperature sensor 36 becomes the set temperature for protection Tu or more ("Yes" in step 124), the combustion heater 15 is switched off (step 134).

Accordingly, in step 135, the detected temperature T1 of the first temperature sensor 36 is compared with the set temperature for heat-radiating Tr, and when it has become the set temperature for heat-radiating Tr or more ("Yes"), the second switching valve 46 is opened and, along with this, the radiator fan 42 is switched on (step 136). Through this, as indicated by the arrows in FIG. 8, recirculation in which a portion of the hot water which has exited the hot-water heater core 5 passes through the inlet-side interconnection path 44, reaches the radiator 39, is forcibly caused to radiate heat thereat, and thereafter passes through the cooler 13 and outlet-side interconnection path 45 to reach the water pump 35 is performed in conjunction, and heat from the hot water passing through the coolant-water path 40 is radiated to outside the vehicle and temperature is lowered. Moreover, it is acceptable to switch off the second water pump 37 while this second switching valve 46 is open.

Thereafter, when the detected temperature T1 of the first temperature sensor 36 drops below Tr ("No" in step 135), the second switching valve 46 is closed in step 137. At this time, similarly to the above-described step 131, the radiator fan 42 is switched on (step 139) or off (step 134) by the control based on the detected temperature T2 of the second temperature sensor 41.

According to the present embodiment, similarly to the above-described first embodiment, favorable practical effects can be obtained in which a superheated state of hot water can be prevented without causing the combustion heater 15 to be stopped and hot air for warming can be supplied stably, even when the amount of radiated heat from the hot-water heater core 5 is small.

Additionally, the present embodiment in particular is a structure connecting the hot-water recirculation path 32 with respect to the independently operable cooling device 33 (coolant-water path 40) so as to use a portion of the coolant-water path 40 thereof as a heat-radiating passage when needed, and so although structure requires respective first and second water pumps 35 and 37 in the hot-water recirculation path 32 and coolant-water path 40 and is somewhat complex, the hot-water recirculation path 32 and cooling device 33 can be caused to operate as separate systems, and advantages can be obtained such as being able to perform a temperature rise of hot water rapidly without usurping heat in the cooler 13 when starting heating in for example winter.

(3) Third Embodiment

Figure 10:
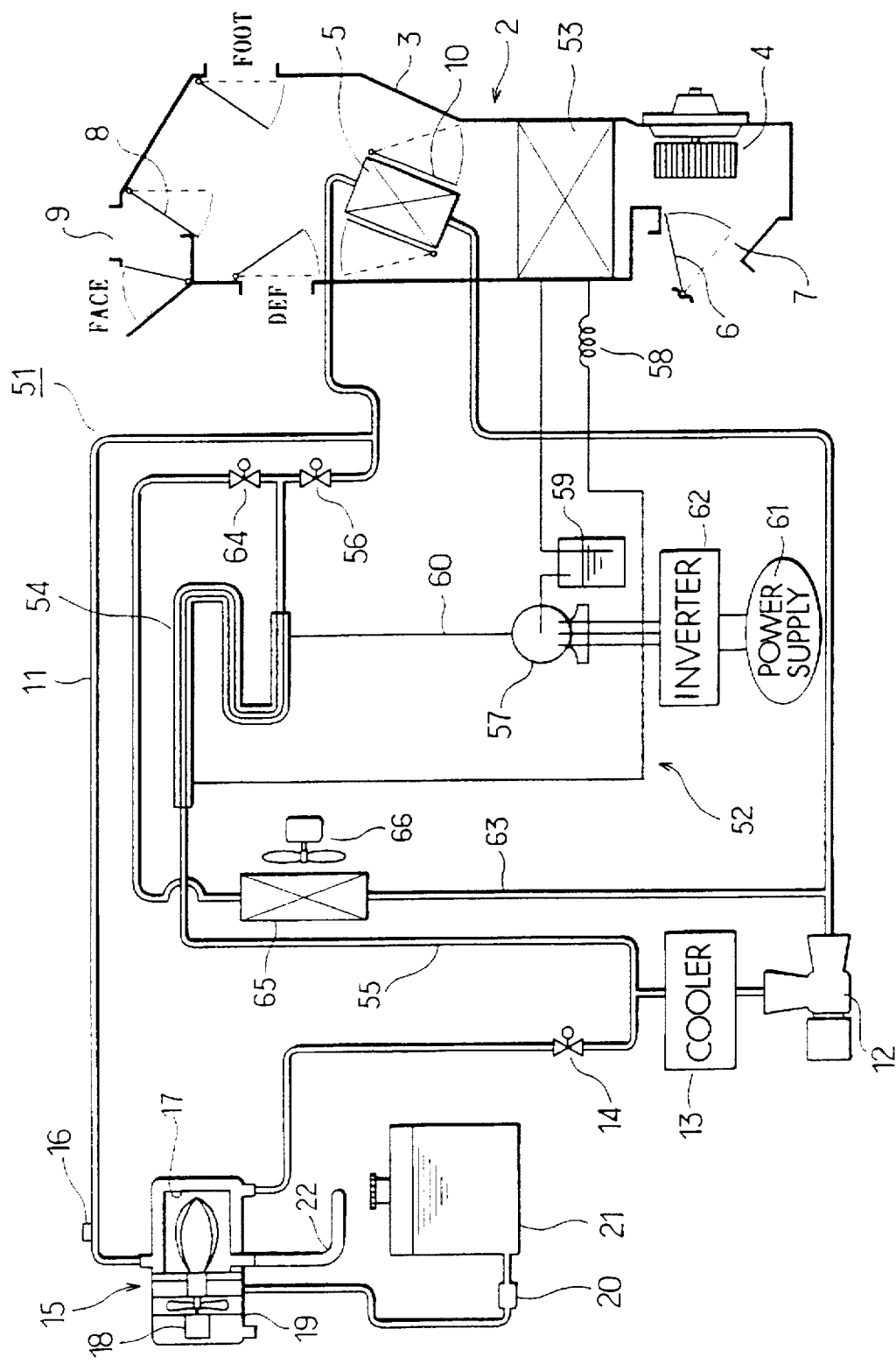
FIG. 10 is a schematic view indicating an overall system structure of an air conditioning apparatus relating to a third embodiment according to the present invention.

FIGS. 10 and 11 indicate a third embodiment according to the present invention. Of these, FIG. 10 indicates a system structure of an air-conditioning apparatus 51 relating to the present embodiment. Indicated herein is a state wherein a refrigeration cycle 52 for cooling is incorporated in addition to a heating device using a combustion heater 15, and an evaporator 53 is provided within a body unit 2. Additionally, the present embodiment is such that a water-refrigerant heat exchanger 54 plays a role as a condenser of the refrigeration cycle 52.

In this case, a hot-water recirculation path 11 which recirculatingly supplies hot water to a hot-water heater core 5 is structured of the hot-water heater core 5, a water pump 12, a cooler 13 of a motor for running use and an inverter device, a first switching valve 14, and the combustion heater 15, which are connected into a closed loop, similarly to the above-described first embodiment. A temperature sensor 16 which is a temperature-detecting device is provided in the proximity of the temperature sensor 16.

Accordingly, a heat-exchange water path 55 is connected to the hot-water recirculation path 11. An inlet side of this heat-exchange water path 55 is connected between the cooler 13 and switching valve 14, and an outlet side is connected to an upstream portion of the hot-water heater core 5. The water-refrigerant heat exchanger 54 is disposed in an intermediate portion of this heat-exchange water path 55, and along with this, a third switching valve 56 is positioned further to the outlet side thereof.

Meanwhile, the refrigeration cycle 52 is structured by successively connecting the water-refrigerant heat exchanger 54, an expansion valve 58, the evaporator 53, and an accumulator 59 in a closed loop by refrigerant piping 60, and a predetermined amount of refrigerant is enclosed therewithin. Heat exchange of water passing through the heat-exchange water path 55 and refrigerant passing through the refrigerant piping 60 is performed in the water-refrigerant heat exchanger 54; while the refrigerant is condensed, the water is heated. Moreover, the compressor 57 is driven by an inverter device 62 connected to a power source 61.

A radiator water path 63 is connected between a portion between the water-refrigerant heat exchanger 54 of the heat-exchange water path 55 and the third switching valve 56 and an upstream-side portion of the water pump 12 of the hot-water recirculation path 11. A second switching valve 64 which is a switching device and a radiator 65 which is a heat-radiating device are provided in this radiator water path 63. Air-blowing by a radiator fan 66 is performed in the radiator 65. Through this, the heat-radiating passage is structured from the heat-exchange water path 55 and radiator water path 63.

In this structure, the combustion heater 15, water pump 12, first switching valve 14, second switching valve 64, third switching valve 56, radiator fan 66, and compressor 57 are controlled as shown in FIG. 11 by an ECU not illustrated. Moreover, although not illustrated, switching of HI and LO operation of the combustion heater 15 is of course performed.

Through this, when in cooler mode in summer or the like, recirculation is repeatedly performed in which refrigerant which has become high in temperature and high in pressure due to drive by the compressor 57 is liquefied by the heat-exchange water path 55, becomes a mist due to the expansion valve 58, reaches the evaporator 53, usurps heat from outside, and is evaporated, and thereafter returns via the accumulator 59 to the compressor 57; wind generated by a blower 4 passes through the evaporator 53 portion and is cooled, and chilled air is supplied within the passenger compartment thereby. Additionally, recirculation is performed at this time wherein hot water which has passed through the cooler 13 due to drive of the water pump 12 passes through the water-refrigerant heat exchanger 54 of the heat-exchange water path 55, enters the radiator water path 63 from the second switching valve 64, is cooled by the radiator 65, and returns to the water pump 12.

Accordingly, when in heater mode in winter or the like, recirculation is repeated in which hot water in the hot-water recirculation path 11 is heated by the combustion heater 15, flows into the hot-water heater core 5, and thereafter passes through the water pump 12 and cooler 13 to reach the combustion heater 15; along with this, a portion of the hot water is diverted downstream of the cooler 13 to the heat-exchange water path 55 side, passes through the water-refrigerant heat exchanger 54, passes through the third switching valve 56, and is united with the hot-water recirculation path 11 before the hot-water heater core 5.

During this heating, furthermore, when the amount of radiated heat from the hot-water heater core 5 has become small and a detected temperature T0 of the temperature sensor 16 becomes a set temperature for heat-radiating Tr or more, the second switching valve 64 is opened and the third switching valve 56 is closed, and the radiator fan 66 is switched on. Through this, recirculation is performed in which hot water passing through the water-refrigerant heat exchanger 54 within the heat-exchange water path 55 passes through the radiator water path 63 and reaches the radiator 65, and after radiating heat thereat, again reaches the water pump 12. Additionally, the third switching valve 56 may be caused to be opened at this time.

According to the present embodiment as well, similarly to the above-described first embodiment and the like, favorable practical effects can be obtained in which a superheated state of hot water can be prevented without causing the combustion heater 15 to be stopped and hot air for warming can be supplied stably, even when the amount of radiated heat from the hot-water heater core 5 is small.

(4) Fourth Embodiment

Figure 12:
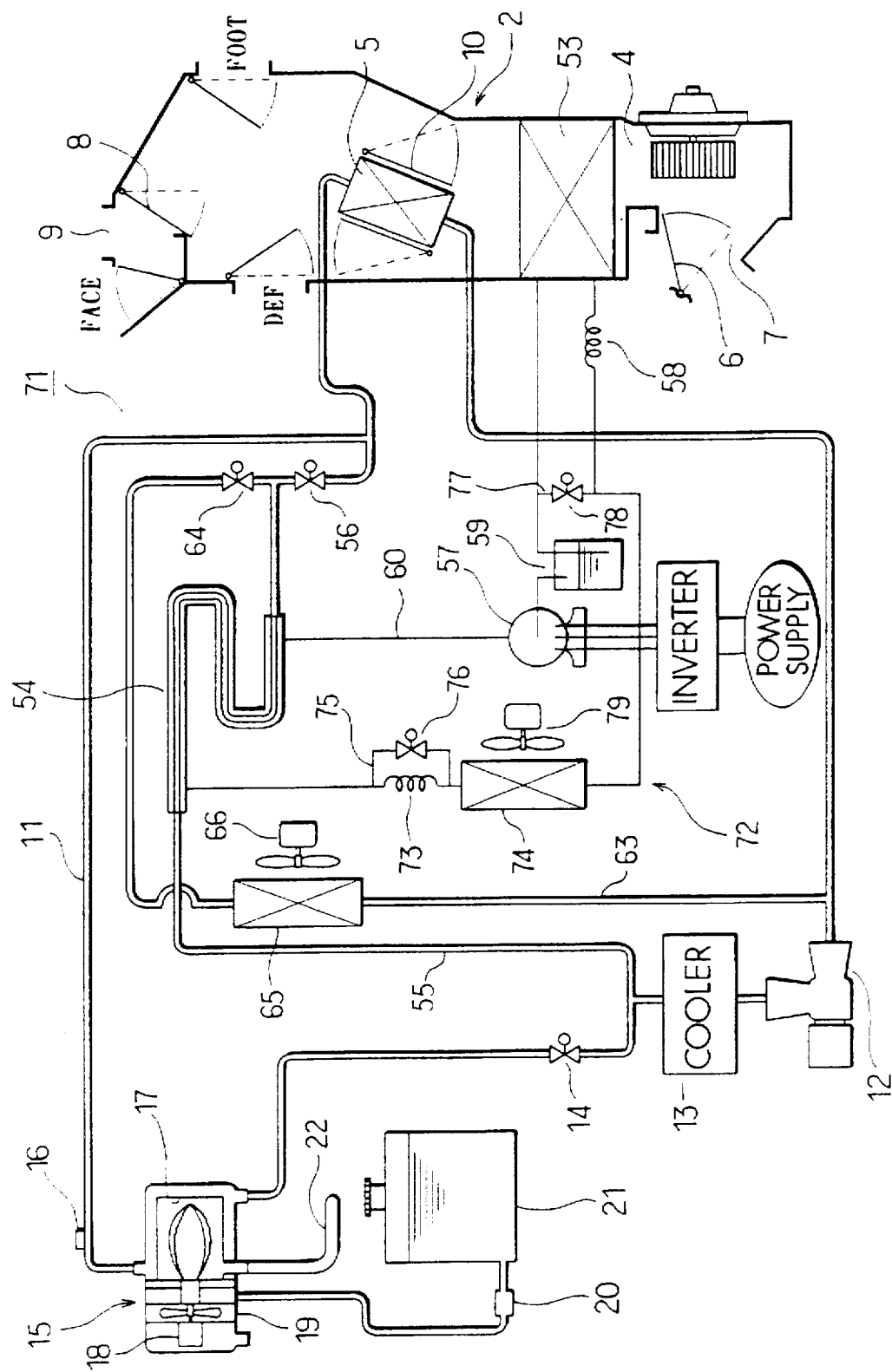
FIG. 12 is a schematic view indicating an overall system structure of an air conditioning apparatus relating to a fourth embodiment according to the present invention.

Lastly, FIG. 12 indicates a system structure of an air-conditioning apparatus 71 relating to a fourth embodiment according to the present invention. The present embodiment differs from the foregoing third embodiment in that a function of a dehumidifying mode is added to a refrigeration cycle 72.

That is to say, this refrigeration cycle 72 is structured by successively connecting a water-refrigerant heat exchanger 54, a second expansion valve (capillary) 73, an external heat exchanger 74, an expansion valve 58, an evaporator 53, and an accumulator 59 in a closed loop by refrigerant piping 60, and along with this, a first electromagnetic valve 76 is provided in a bypass path 75 which bypasses the second expansion valve 73, and moreover a second electromagnetic valve 78 is provided in a bypass path 77 which bypasses the expansion valve 58 and evaporator 53. Moreover, a fan device 79 which blows air toward the external heat exchanger 74 is provided.

In this case, in a cooler mode the compressor 57 is driven in a state wherein the first electromagnetic valve 76 is opened, the second electromagnetic valve 78 is closed, and the fan device 79 has been switched on. Through this, similarly to the above-described third embodiment, cold air is generated in the evaporator 53 portion and is supplied within the passenger compartment. Additionally, similar circulation is performed at this time whereby hot water which has passed through a cooler 13 passes through the water-refrigerant heat exchanger 54 and is cooled by a radiator 65.

During the dehumidifying mode, accordingly, the compressor 57 is driven, and along with this, the first electromagnetic valve 76 and second electromagnetic valve 78 are both closed, and the fan device 79 is switched off. Meanwhile, a water pump 12 is driven, and together with this, a second switching valve 64 is closed and a third switching valve 56 is opened at this time. Through this, hot water heated by the water-refrigerant heat exchanger 54 is supplied to the hot-water heater core 5, and thereby cold air evaporated at the evaporator 53 portion is generated and is supplied to the passenger compartment in a state of having been heated by the hot-water heater core 5. At this time, the first switching valve 14 may be caused to be opened, and moreover dehumidified cooling can be performed if the hot-water heater core 5 is driven.

During a heating mode, operation similar to the above-described third embodiment is performed; when a detected temperature T0 of a temperature sensor 16 has become a set temperature for heat-radiating Tr or more, heat radiation by the radiator 65 is performed and the temperature of the hot water is lowered without causing the combustion heater 15 to be stopped.

Additionally, according to this structure, heating which utilizes the refrigeration cycle 72 as a heat pump also becomes possible. At this time, the compressor 57 is driven and the first electromagnetic valve 76 is opened and the second electromagnetic valve 78 is closed, and meanwhile the water pump 12 is driven and, along with this, the second switching valve 64 is closed and the third switching valve 56 is opened. Through this, the external heat exchanger 74 is caused to function as an evaporator and refrigerant is caused not to pass through the evaporator 53, and hot water heated by the water-refrigerant heat exchanger 54 can be supplied to the hot-water heater core 5.

Moreover, water (hot water) was utilized as a thermal medium of the combustion heater according to the foregoing embodiment, but employment of for example antifreeze or the like is also acceptable. Additionally, the combustion heater 15 was structured to perform two-stage Hi and Lo switching of the amount of generated heat, but structuring so as to be able to switch to multiple stages of three or more stages is also possible. Furthermore, if the radiator (heat-radiating device) has ample heat-radiating capacity even with only ventilation accompanying vehicle travel, a radiator may not necessarily be provided.

Additionally, the present invention is not exclusively limited to the above-described several embodiments, and for example may be applied in an engine-powered vehicle and not exclusively an electric vehicle; in this case the engine becomes the power source of the vehicle. Additionally, modification according to convenience within a scope which does not depart from the essence is possible, i.e., it is also acceptable to provide a heat-radiating passage and heat exchanger separately from a cooling device of a motor for running use and the like.

As is clear in the foregoing description, favorable effects such as the following can be obtained according to the present invention.

Namely, an automotive air-conditioning apparatus attempted to obtain hot air for warming by a combustion heater and provided a temperature-detecting device to detect temperature of a thermal medium and a heat-radiating device to radiate heat of the thermal medium to outside the vehicle when a detected temperature of this temperature-detecting device became a predetermined temperature or more, and so the temperature of the thermal medium can be lowered without causing the combustion heater to stop and thereby a superheated state of the thermal medium can be prevented to a great extent and hot air for warming can be stably supplied, even when an amount of radiated heat of a heat exchanger for heating is small.

The automotive air conditioning apparatus includes a main body unit provided with a heat exchanger for heating within an air passage of a blower to a vehicle passenger compartment, a thermal-medium recirculation path to recirculatingly supply a thermal medium to the heat exchanger for heating, a combustion heater disposed within this thermal-medium recirculation path to heat the thermal medium, a heat-radiating passage wherein an inlet portion and outlet portion are connected to the thermal-medium recirculation path, a heat radiator disposed in this heat-radiating passage to radiate heat of thermal medium passing through the heat-radiating passage to a vehicle exterior, a switching device to open and close the heat-radiating passage, a temperature-detecting device to detect temperature of thermal medium in the thermal-medium recirculation path, and a switch-controlling device to cause to open the switching device when temperature detected by this temperature-detecting device has become an set temperature for heat-radiating use or more, and so the temperature of the thermal medium can be lowered without causing the combustion heater to stop, a superheated state of the thermal medium can be prevented, and hot air for warming can be stably supplied, even when an amount of radiated heat of a heat exchanger for heating is small.

Additionally, when structured so that the combustion heater is caused to be stopped when detected temperature of the temperature-detecting device becomes an set temperature for protection or more which is higher than the set temperature for radiating heat, protection of the piping and the like of the combustion heater and thermal-medium recirculation path can be performed more effectively.

Furthermore, when structured so that recirculation of thermal medium in the heat-radiating passage and recirculation of thermal medium in the thermal-medium recirculation path are performed by one pump, structure can be caused to be simple in comparison with a case where a pump is provided respectively in both the heat-radiating passage and the thermal-medium recirculation path.

What is claimed is:

1. An automotive air conditioning apparatus comprising:

a blower for blowing air;

a main body unit forming an air passage, said blower being disposed upstream of said air passage;

a heat exchanger disposed in said air passage for heating said air led to a vehicle passenger compartment;

a thermal-medium recirculation path to recirculatingly supplying a thermal medium to said heat exchanger;

a combustion heater disposed within said thermal-medium recirculation path for heating said thermal medium;

a heat-radiating passage having an inlet portion and outlet portions connected to said thermal-medium recirculation path;

a heat radiator disposed in said heat-radiating passage for radiating heat of said thermal medium passing through said heat-radiating passage;

switching means for switching to open and close said heat-radiating passage;

detecting means for detecting temperature of said thermal medium in said thermal-medium recirculation path;

controlling means for controlling said switching means to open when a temperature detected by said detecting means reaches at least a set temperature of radiating heat, a pump performing recirculation of said thermal medium in said heat-radiating passage and recirculation of said thermal medium in said thermal-medium recirculation path, and a cooler for cooling a device which generates heat when the device is operated, said cooler being disposed in said thermal-medium recirculation path, wherein said heat-radiating passage diverges from between said combustion heater and said cooler connects upstream of said pump.

2. An automotive air conditioning apparatus according to claim 1, wherein said heat-radiating passage and said heat radiator are commomly used with at least one portion of a cooling apparatus provided to cool a power source of a vehicle.

3. An automotive air conditioning apparatus according to claim 1, wherein said combustion heater stops when a detected temperature of said detecting means reaches an set temperature for protection or more which is higher than said set temperature for radiating heat.

* * * * *